United States Patent
Krupyshev et al.

(10) Patent No.: US 7,880,155 B2
(45) Date of Patent: Feb. 1, 2011

(54) SUBSTRATE ALIGNMENT APPARATUS COMPRISING A CONTROLLER TO MEASURE ALIGNMENT DURING TRANSPORT

(75) Inventors: Alexander G. Krupyshev, Chelmsford, MA (US); Sergei E. Syssoev, North Andover, MA (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

(21) Appl. No.: 11/453,395

(22) Filed: Jun. 15, 2006

(65) Prior Publication Data
US 2007/0290150 A1 Dec. 20, 2007

(51) Int. Cl.
*G01N 21/86* (2006.01)
*G01V 8/00* (2006.01)

(52) U.S. Cl. .............. 250/559.3; 250/559.12; 250/559.33; 250/559.36; 414/776; 414/779

(58) Field of Classification Search ........... 250/559.12, 250/559.29, 559.36, 559.38, 559.3; 414/757, 414/774, 775, 776, 777, 778, 779, 781, 782, 414/783, 784
See application file for complete search history.

(56) References Cited

U.S. PATENT DOCUMENTS

| | | | |
|---|---|---|---|
| 4,770,590 A | 9/1988 | Hugues et al. | 414/172 |
| 4,819,167 A | 4/1989 | Cheng et al. | 364/167.01 |
| 4,825,808 A | 5/1989 | Takahashi et al. | 118/719 |
| 5,466,945 A * | 11/1995 | Brickell et al. | 250/559.12 |
| 5,563,798 A | 10/1996 | Berken et al. | 364/478.06 |
| 5,695,564 A | 12/1997 | Imahashi | 118/719 |
| 5,788,447 A | 8/1998 | Yonemitsu et al. | 414/217 |
| 5,882,165 A | 3/1999 | Maydan et al. | 414/217 |
| 6,147,356 A * | 11/2000 | Hahn et al. | 250/559.29 |
| 6,195,619 B1 * | 2/2001 | Ren | 702/155 |
| 6,198,976 B1 | 3/2001 | Sundar et al. | 700/59 |
| 6,852,194 B2 | 2/2005 | Matsushita et al. | 156/345.32 |
| 6,962,471 B2 | 11/2005 | Birkner et al. | 414/217 |
| 7,090,741 B2 | 8/2006 | Narushima et al. | 156/345.26 |
| 2004/0167743 A1 * | 8/2004 | Hosek | 702/155 |
| 2004/0261550 A1 * | 12/2004 | Asa | 73/865.9 |
| 2005/0281661 A1 * | 12/2005 | Kesil et al. | 414/744.5 |

\* cited by examiner

*Primary Examiner*—Georgia Y Epps
*Assistant Examiner*—Francis M Legasse, Jr.
(74) *Attorney, Agent, or Firm*—Perman & Green, LLP; Richard Pickreign

(57) ABSTRACT

A substrate processing apparatus has a substrate transport apparatus for transporting substrates, a sensor, and a control system. The processing apparatus is adapted to effect relative movement between the substrate and the sensor. The processing apparatus is further adapted to determine a position of the substrate by sensing the substrate with the sensor.

33 Claims, 9 Drawing Sheets

SUBSTRATE ALIGNMENT APPARATUS COMPRISING A CONTROLLER TO MEASURE ALIGNMENT DURING TRANSPORT

BACKGROUND

1. Field

The disclosed embodiments relate to substrate processing apparatus and, more particularly, to substrate processing apparatus with features to determine substrate alignment.

2. Brief Description of Related Developments

The manufacture of semiconductor devices, flat panel displays, and like products typically employ precision transport of substrates by specialized transport apparatus. Many of the involved manufacturing steps use a particular environment such as ultra-purified air or vacuum. The high cost of creating and maintaining such environments has led to constraints on substrate transport including narrow transport pathways, high precision substrate placement, and high speed of operation. Although substrate locations may be tracked via computer, actual locations may vary from model locations because of variations in placement within a substrate cassette, movement induced in a manufacturing process, small imperfections in system alignment and calibration, or other factors.

There are a number of conventional techniques for ascertaining the precise location of a substrate, so that positional errors may be corrected. One example of a conventional alignment system is described in U.S. Pat. No. 5,563,798. This document discusses calculating a wafer position from two or more discrete data points detected on the edge of the wafer as the wafer is transported by a transport robot. The position of the robot may then be adjusted to compensate for wafer misalignment. Similarly, U.S. Pat. No. 6,198,976 discusses calculating the center of a substrate relative to a reference point, using at least three discrete data points on the edge of the substrate. There are several problems with these types of conventional systems that rely on detection of discrete points. For one, the systems generally require multiple sensors to detect the discrete edge points. This complexity increases both and cost and the possibility for error from a defect in construction or calibration. Yet if only one sensor is used, the substrate must be repeatedly passed through the sensor so that the multiple edge points may be detected. The repeated passing of the substrate through the sensor increases the time required to complete an alignment process. Another problem with systems that detect discrete edge points is that they are subject to error due to variations in the wafer edge. These variations may throw off the location of one or more data points.

In other conventional techniques, prealigner devices may operate through rotating a substrate on a spindle and scanning the edge thereof with a sensor, to determine substrate position error or eccentricity. However, this typically requires execution of additional steps by a transport apparatus, which must place the substrate on the prealigner and then, after some duration, pick the substrate from the prealigner. These extra steps may slow down system operation. The exemplary embodiments described below may allow determination of substrate position while the substrate is in transit or, in other words, "on the fly", and they overcome the problems of conventional positioning systems.

SUMMARY

In one embodiment, a substrate processing apparatus comprises a transport apparatus adapted for transporting a substrate between processing stations of the apparatus. The processing apparatus further comprises at least one sensor connected to the transport apparatus and capable of sensing the substrate transported by the transport apparatus, the at least one sensor being arranged for sending at least one signal in response to sensing the substrate. The processing apparatus still further comprises a controller communicably connected to the sensor and arranged to determine alignment of the substrate in at least two directions, angled relative to each other, relative to a predetermined location from the at least one signal sent by but one of the at least one sensor when sensing the substrate no more than once.

In another embodiment, a system for determining the position of a substrate comprises a control system and a substrate transport apparatus connected to the control system and capable of transporting the substrate. The system for determining the position of a substrate further comprises a sensor, connected to the control system, and having a sensor beam with a substantially linear beam cross-section, the sensor being adapted for sensing the substrate when the substrate intersects the sensor beam. The control system is adapted to generate relative movement between the substrate and the sensor so that the substrate breaks the sensor beam. The sensor is adapted for sending the control system an electronic signal embodying an area measurement of a segment of the substrate within the sensor beam.

In still another embodiment, a substrate processing apparatus comprises a frame, a substrate station connected to the frame, and a control system. The processing apparatus further comprises a substrate transport apparatus, the transport apparatus connected to the frame and communicably coupled to the control system. The processing apparatus still further comprises a beam sensor connected to the frame for collecting edge profile data of the substrate, the sensor being communicably connected to the control system. The control system is adapted to effect relative movement between the substrate and the sensor, and the sensor is adapted to generate an electronic signal with data that embodies an edge profile of the substrate. The control system is further adapted to determine, using the edge profile, an offset of the substrate, in at least two directions, from a predetermined location, and to adjust movement of the transport apparatus to compensate for the offset and to position the substrate at the predetermined location at the substrate station.

In yet another embodiment, a method for processing substrates in a substrate processing apparatus comprises generating an electronic substrate calibration signature. The method further comprises providing the apparatus with a through beam sensor, capable of sensing the substrate moving through the sensor, and a controller communicably connected to the sensor. The method still further comprises sensing the substrate with the sensor, and in response to sensing the substrate, the sensor sending a signal to the controller embodying an electronic signature of the substrate. The method yet further comprises comparing, with the controller, an electronic signature of the substrate with the electronic substrate calibration signature to determine alignment of the substrate relative to a predetermined location.

BRIEF DESCRIPTION OF THE DRAWINGS

The foregoing aspects and other features of the present invention are explained in the following description, taken in connection with the accompanying drawings, wherein.

DETAILED DESCRIPTION

Figure 1:
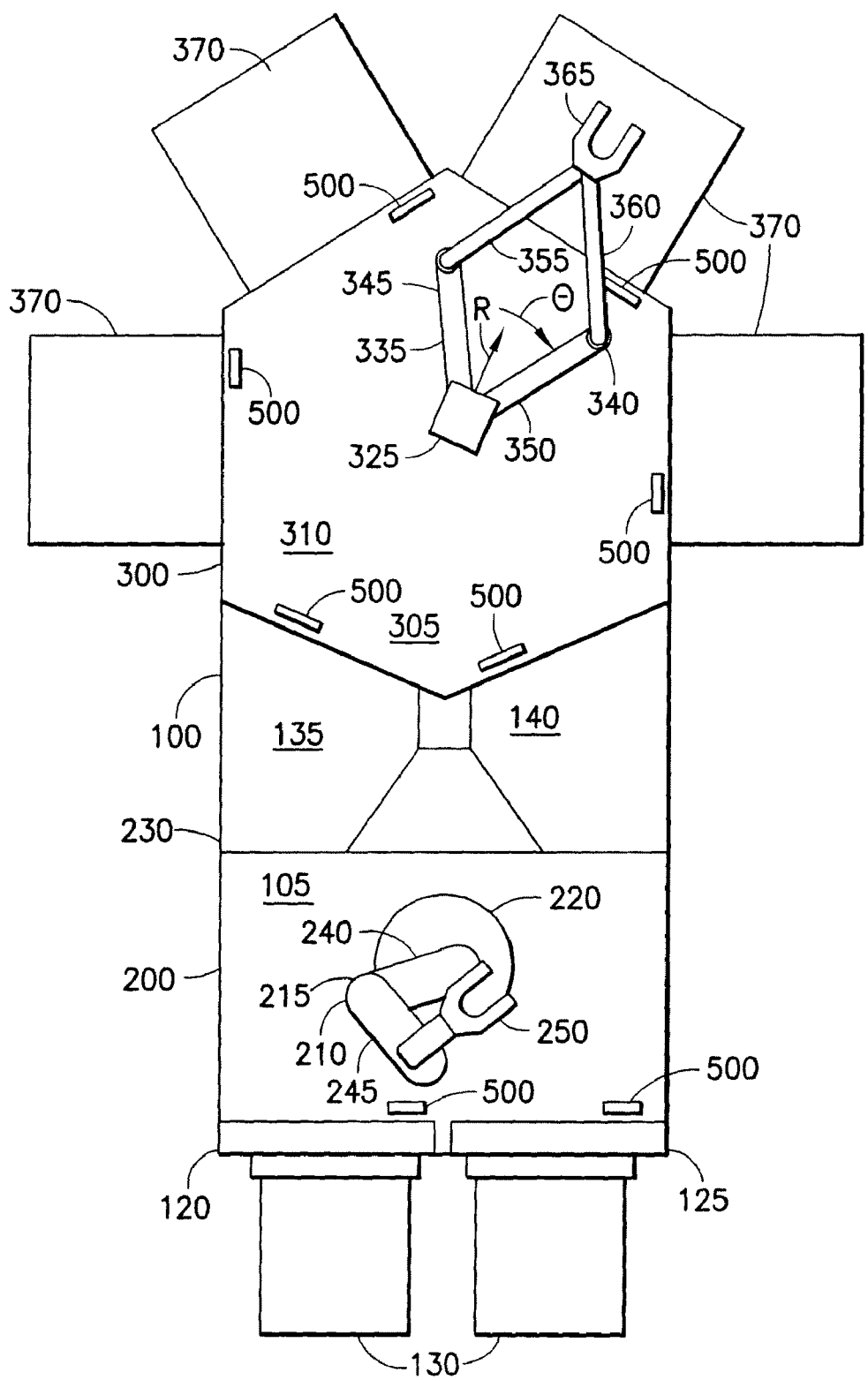
FIG. 1 is a schematic diagram of a substrate processing apparatus features in accordance with an exemplary embodiment.

FIG. 1 illustrates an exemplary substrate processing apparatus 100. Although the present embodiments will be described with reference to the exemplary embodiments shown in the drawings and described below, it should be understood that the present embodiments could be embodied in many alternate forms. In addition, any suitable size, shape, or type of elements of materials may be used. Exemplary substrate transport apparatus 100, shown in FIG. 1, may be used for processing semiconductor substrates such as the silicon disks or wafers (e.g. 200 mm, 300 mm, 450 mm or larger) which are used as substrates for the manufacture of integrated circuits. Other embodiments of the present invention may be used for processing substrates of any suitable size, shape or material, such as rectangular substrates for the manufacture of flat panel displays. The apparatus may, for convenience, be described as having a front end 200 and a back end 300. A frame 230 structurally connects different parts of the processing apparatus. Various components of both the front end 200 and back end 300 may be operably connected to a control system 490 (shown in FIG. 6), which may direct and synchronize various automated tasks during substrate processing. The control system 490 may be a network of computers, single computer, distributed control system, or any other suitable system.

The front end 200, that for example may be an environmental front end module (EFEM) though in alternate embodiments the front end of the apparatus may be of any suitable type, generally comprises a substrate transport apparatus 210 operating within an isolated environment 105. Suitable examples of an EFEMs are disclosed in U.S. patent applications Ser. No. 11/178,830 and Ser. No. 11/178,836, which are both incorporated herein by reference. Transport apparatus 210 may have arm 215 and a drive mechanism 220 that operates to move the arm. Drive mechanism 220 may be connected directly to the frame 230, and may be operably connected to the control system 490.

The apparatus shown in FIG. 1 is a representative substrate processing apparatus, and in alternate embodiments the apparatus may have any desired configuration. In the exemplary embodiment, arm 215 of substrate transport apparatus 210 comprises an upper arm 240, forearm 245, and end effector 250. Upper arm 240 is connected to the drive mechanism 220 at its proximal end. The proximal end of forearm 245 is pivotally connected to the distal end of upper arm 240. End effector 250 is attached to the distal end of forearm 245. Positional encoders (not shown) in the drive mechanism 220 may generate positional information such that the control system 490 can accurately determine the actual positioning of the transport apparatus 210, including the precise location and orientation of the end effector 250. In alternate embodiments, the transport apparatus may not have an arm and may, for example, move the substrate using a system of one or more rails, or may transport the substrate using any other suitable devices or structures.

In the exemplary embodiment shown, the front end 200 also includes two load ports 120,125. The load ports provide an interface with portable substrate cassettes 130. Each substrate cassette 130 is adapted to hold several substrates, and may hold them within a sealed enclosure such as a FOUP of SMIF pod, or any other suitable enclosure. In alternate embodiments, the substrate cassettes 130 may be open rather than enclosed. The load ports 120,125 may removably hold the cassettes 130 and may include mechanisms (not shown) to open cassette doors. These mechanisms may allow access by the front end substrate transport apparatus 210 to substrates located in the cassettes 130. In the exemplary embodiment, shown located slightly toward the transport apparatus 210 from each load port 120, 125 is an alignment sensor 500, for sensing the position of a substrate as it is moved past the sensor by the transport apparatus. In alternate embodiments, the sensor may be positioned in any suitable location, such as a position allowing the sensor to sense substrates transported by the transport apparatus along desired transport paths to one or more stations of the front end. Opposite the transport apparatus 210 from the load ports 120,125 may be load locks 135,140. Load locks 135,140 connect the front end 200 to the back end 300. Each load lock may have a valve (not shown) connecting it to an isolated environment 105 of the front end 200 and another valve connecting it to an isolated environment 310 contained in the transport chamber 305 of the back end 300. The isolated environment 310 of the transport chamber 305 may be a vacuum, inert gas such as nitrogen, or other fluid. The isolated environment 105 of the front end 200 may consist of clean air at atmospheric pressure, which may be maintained with very low levels of particulate contaminants. The load locks 135,140 may allow for passage of substrates between the front end 200 and the back end 300 while maintaining separation of the two isolated environments 105,310. In alternate embodiments, there may be no load locks. Each load lock 135, 140 of the exemplary embodiment may have an associated substrate sensor 500, located outside of the load lock and toward the rear end transport apparatus 320. In the exemplary embodiment, one or more of these sensors 500 may be used in substrate alignment procedures, as will be described below.

Back end 300 comprises the transport chamber 305, which may be formed by the frame 230. A substrate transport apparatus 320 is located within the transport chamber 305. In the exemplary embodiment, transport apparatus 320 may comprise a drive mechanism 325 connected to the frame 315, and may further comprise a pair of opposing arms 335,340 connected to an end effector 365. A suitable example of a transport apparatus is the MagnaTran® available from Brooks Automation. Drive mechanism 325 may be connected to the control system 490. The drive mechanism 325 of the exemplary embodiment may incorporate positional encoders (not shown) indicating the precise positioning of the transport apparatus 320 to the control system 490. As shown in FIG. 1, the arms 335,340 of the transport apparatus form a frog leg configuration. Two upper arms 345,350 are each connected at their proximal ends to the drive mechanism 325. The distal ends of each of the two upper arms 345,350 are each connected to one of the two forearms 355,360, forming a pair of opposed elbows. The distal ends of the two forearms 355,360 are both pivotally connected to the end effector 365. End effector 365 is shown as having a flat U-shape and may be similar to end effector 250 of the front end substrate transport apparatus 210. In alternate embodiments, the transport apparatus may be provided with any suitable types of end effectors, or without end effectors.

Several processing modules 370 are shown located on the periphery of the transport chamber 305. The processing modules 370 may operate on the substrates through various deposition, etching, or other types of processes to form electrical circuitry or other desired structure on the substrates. Typical processes include but are not limited to etching, chemical vapor deposition (CVD), physical vapor deposition (PVD), ion implantation, metrology, rapid thermal processing (RTP), and dry stripping. The processing modules 370 may be connected to the chamber 305 to allow substrates to be passed from the transport chamber to the processing modules and vice versa. In the exemplary embodiment, within transport chamber 305 and just outside of each processing module 370 is a sensor 500, which may be used to sense substrate position and perform alignment procedures. In alternate embodiments, the substrate processing apparatus may employ any number of sensors, and the sensor or sensors may be located at any suitable locations. As noted above, in the exemplary embodiment the two load locks 134,140 are also connected to the transport chamber 305, allowing passage of substrates between the back end transport chamber 305 and the front end 200.

Figure 2:
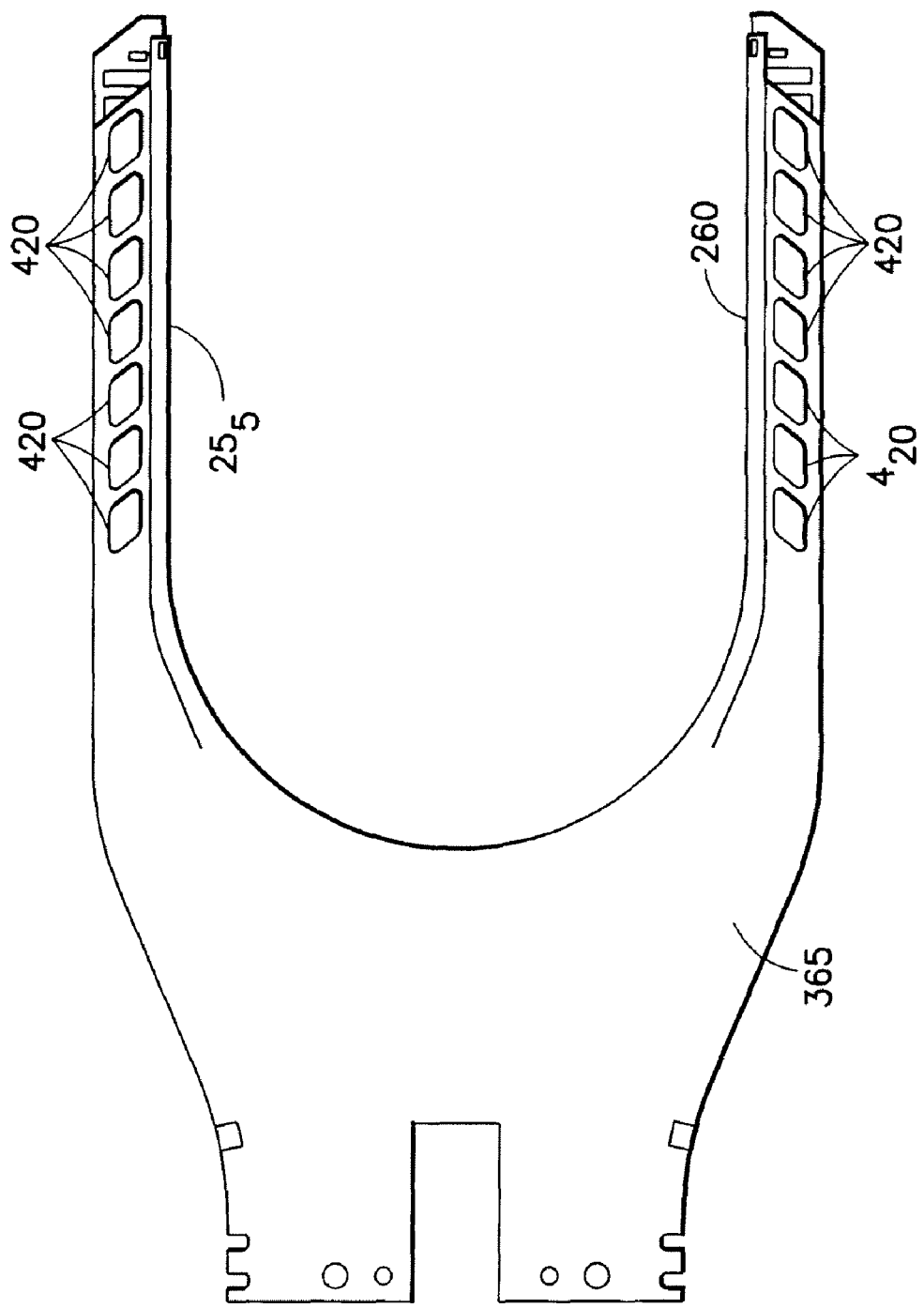
FIG. 2 is a top view of a transport apparatus end effector which may be used in the substrate processing apparatus shown in FIG. 1.

FIG. 2 illustrates a top perspective view of the end effector 365 shown in FIG. 1. End effector 250 may also have a similar design. In the exemplary embodiment, the end effector 365 may be generally U-shaped and may comprise a proximal area 410 and two distal tines 255,260. A row of contact pads 420 is located on the upper surface of each tine. The contact pads 420 may make physical contact with the substrate during transport of the substrate. The contact pads 420 may be formed of an elastomeric material with a high frictional coefficient, such as polyetheretherketone (PEEK), to resist sliding of a substrate relative to the end effector. In the exemplary embodiment, the end effector 365 may not be capable of positioning the substrate relative to a desired location on the end effector. As may be realized, a substrate may be positioned on the end effector within some range, and could be offset from, for example, a central position (or any other desired end effector location) in any horizontal direction. Thus, if a substrate is offset slightly from an expected location, for example if it is resting with some offset on a group of substrate support pins, the substrate may be similarly offset on the end effector 250 if it is picked from its resting place with the transport apparatus 210. Such offsets may be unintentional and detrimental to the performance of the processing apparatus. It may be desirable to measure and correct for such offsets. In alternate embodiments, the transport apparatus may have substrate-centering end effectors, or some other type of end effector, or may have substrate transport apparatus without end effectors at all. Alternate embodiments may incorporate a substrate transport apparatus of any suitable configuration, which may differ in arm design, or may be without arms, as may be the case with apparatus utilizing slides, rails, or chutes.

An exemplary operation of the substrate processing apparatus 100 is now described. A removable cassette 130 may be docked at load port 120 and another cassette 130 docked at load port 125. The cassettes 130 may be open to allow access by the front end substrate transport apparatus 210. Transport apparatus 210 may approach a cassette 130 with the end effector 250. The front end substrate transport apparatus 210 may then pick the substrate from the cassette 130 and remove it, passing the substrate over the sensor 500 adjacent to the cassette. The position of the substrate on the end effector 250 may be determined. The transport apparatus 210 may then place the substrate in load lock 135, with any detected offset of the substrate from a desired location being adjusted for. Alternatively, a sensor (similar to sensor 500 in FIG. 1) adjacent to the load lock may be used, or the substrate may be placed in the load lock 135 without finding an offset. In alternate embodiments, the substrate offset may be detected but not adjusted for by the front end transport apparatus 210 prior to placement in the load lock 135. Loading the cassette 130 may be accomplished in a similar but reverse manner, and any substrate offset may be detected and adjusted for in a similar way.

In the exemplary embodiment, back end transport apparatus 320 may pick the substrate from the load lock 135 and onto its end effector 365. If the offset of the substrate has been detected but not adjusted for, the back end transport apparatus may pick the substrate while adjusting for the detected offset, so that the substrate may then be centered on the end effector 365. In alternate embodiments, the back end transport apparatus may pass the substrate over one of the sensors 500 to detect positional offset. Transport apparatus 320 may then place the substrate within one of the processing modules 370. The substrate may be then be picked and placed to and from the various processing modules 370 with the substrate transport apparatus 320 as desired for fabricating structures on the substrate, metrology, or for other procedures. Prior to each placement in one of the processing modules 370, the substrate, if desired, may be passed by a sensor 500 associated with the particular processing module, and the offset of the substrate on the end effector 365 detected using the below described technique. The control system 490 may adjust for any detected offset, to precisely align the substrate with a target location inside a processing module 370. After the substrate has been cycled through the processing modules, it may be placed again in one of the load locks 135,140 for removal by the front end transport apparatus 210 and placement in one of the substrate cassettes 130.

Figure 3:
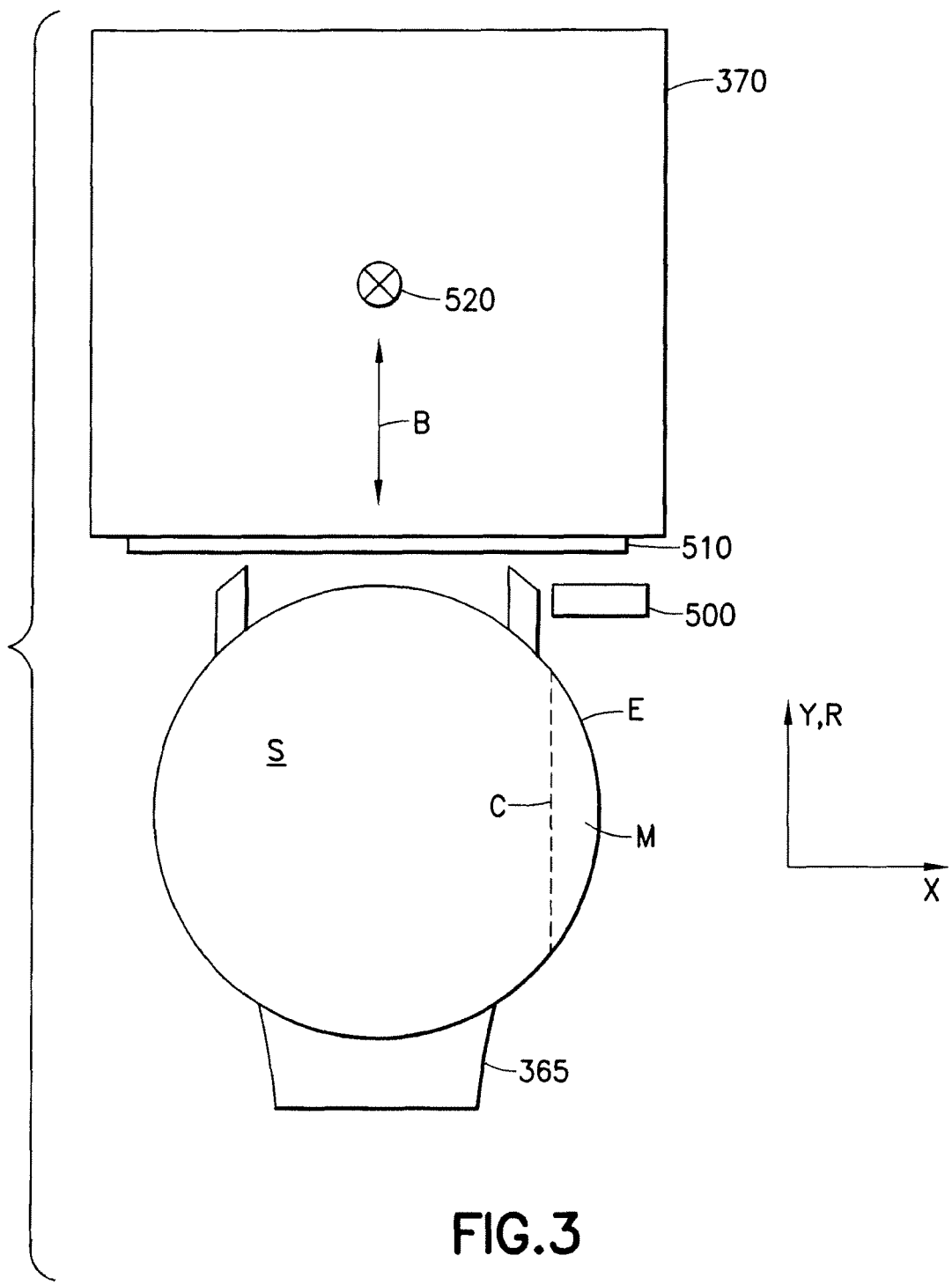
FIG. 3 is a schematic diagram of a portion of the substrate processing apparatus of FIG. 1, and a representative substrate S.

FIG. 3 schematically illustrates an exemplary placement of a sensor 500 within the apparatus. In the exemplary embodiment shown, sensor 500 is placed generally in front of a substrate station of the apparatus, such as an opening of a processing module 370. The sensor, as noted before, may be positioned relative to a substrate transport path, such as a path along which a substrate passes to arrive at the processing module 370. Substrate S is shown on the end effector 365 to indicate a possible position of the substrate as it approaches the processing module 370. In the exemplary embodiment, sensor 500 may be a through beam sensor as described further below. As shown in FIG. 3, in this exemplary embodiment the sensor 500 may be placed proximate the path of substrate (indicated by arrow B) so that the substrate crosses through the sensor when transported along the path. In alternate embodiments, the sensor may be of any suitable type. Generally, the through beam sensor 500 may have a beam emitter and a beam detector. The emitter generates a beam, detected by the sensor, that is interrupted by an object crossing the sensor beam. In alternate embodiments, sensor 500 may be a reflectance type sensor and may detect light reflected from the substrate, or may have some other configuration. In the exemplary embodiment, a light beam 540 (see also FIG. 4) is formed between the light source and the sensor. In the exemplary embodiment, the sensor may be capable of generating a distributed cross section beam for area detection. The light beam may have a narrow, elongate cross sectional area, though in alternate embodiments the light beam may have any other distributed cross section. The light beam may have a multi-wavelength spectrum, or be composed primarily of a specific wavelength, which the sensor may be particularly adapted to detect. This latter configuration may reduce noise from extraneous light sources. The light beam may operate within any suitable wavelength range such as infrared, visible light, or shorter wavelengths. In another embodiment of the present invention, a high frequency acoustic beam or any other suitable type of beam may be used.

In the exemplary embodiment shown in FIG. 3, the sensor 500 is connected to the frame 230 of the processing apparatus. The sensor 500 and sensor beam 540 may be stationary with respect to the processing module 370. In alternate embodiments, the sensor may be movable relative to the frame 230. For example, the sensor 500 may be mounted on the end effector 365, or otherwise mounted on the transport apparatus 320. To determine the position of the substrate, the transport apparatus 320 may move the sensor 500 past the substrate, with at least a section of the substrate passing through and interrupting the beam 540. In other alternate embodiments, the sensor may be mounted on a linear track for translation of the sensor past the substrate. In still another embodiment, the sensor may be mounted on one substrate transport apparatus while the substrate is carried by another substrate transport apparatus. This may allow for sensing of the substrate with the sensor while both the sensor and the substrate are in motion relative to the frame. In still yet other alternate embodiments, any other suitable arrangement allowing for relative motion between the sensor and substrate may be used.

Figure 4:
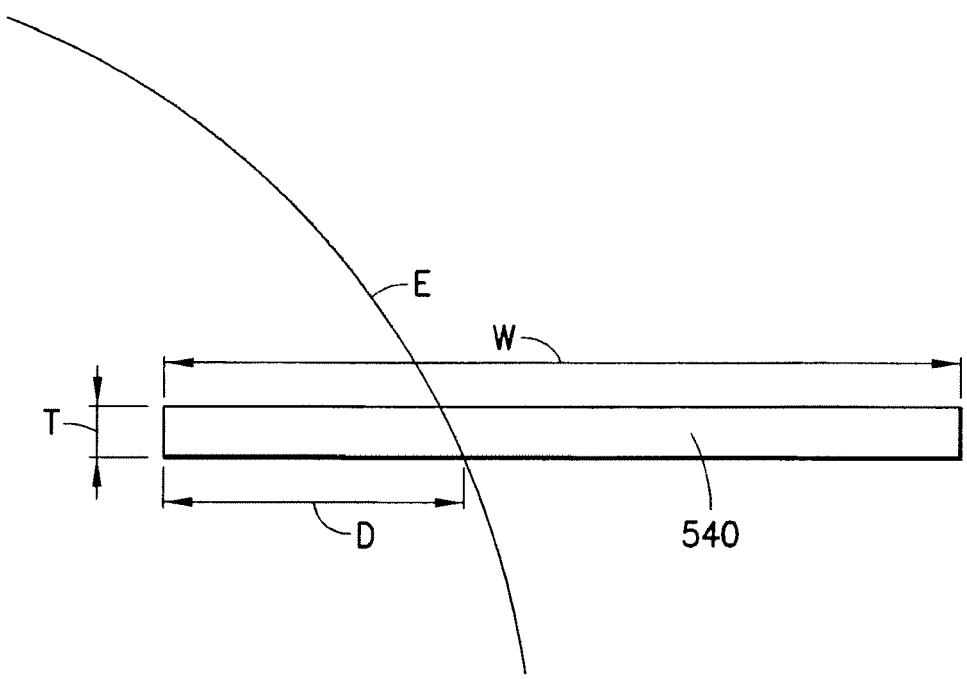
FIG. 4 is a schematic top view of another portion of the apparatus and substrate.
Figure 5:
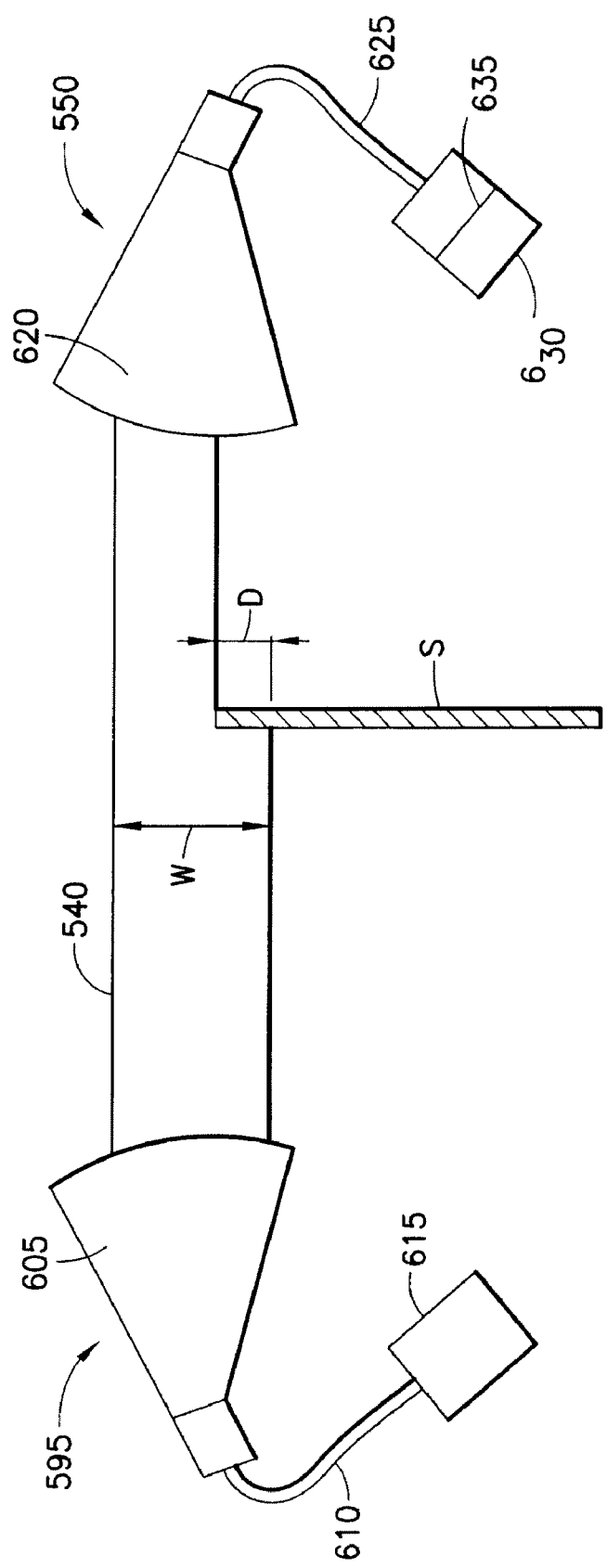
FIG. 5 is schematic diagram showing a sensor of the substrate processing apparatus of FIG. 1.

FIG. 4 and FIG. 5 illustrate schematically an example of how a substrate may be detected by a sensor 500. FIG. 4 is a top view showing substrate S in relation to a sensor light beam 540. Light beam 540 may be sensed by the sensor 500. As may be seen from FIG. 4, in this exemplary embodiment the light beam 540 has a narrow, elongate cross sectional area that is substantially linear. In the example, the width W of the light beam 540 is several times greater than the thickness T of the beam. The orientation of the light beam relative to the substrate, and substrate path B, shown in FIG. 3 is merely exemplary, and in alternate embodiments the sensor may be arranged in any desired orientation. Though direction B is shown as being substantially orthogonal to the beam 540, in alternate embodiments the direction of movement may be at an oblique angle relative to the beam and may be curved. In alternate embodiments, the sensor beam cross-section may have any distributed shape (e.g. round, rectangular). As the substrate S passes the sensor 500, the substrate may intersect the light beam 540. The light beam 540 may be blocked along length D. Thus in the exemplary embodiment, sensor 500, in detecting the light beam 540, may detect the extent to which the substrate S intersects the light beam 540. This may be done by detecting the intensity of light reaching the sensor 500, and thus indirectly detecting a profile line or shape of the substrate passing through the beam (in the example by sensing a substantially instantaneous value for length D). FIG. 5 is a schematic elevation view that shows light beam 540 intersected by substrate S. In this example, a light generator 615 may be connected via fiber optic cable 610 to light emitter 605. Light emitter 605 may be a wide lens, any may direct a distributed cross-section light beam 540 toward sensor 500. Light generator 615 may be a laser, such as a semiconductor laser, or a light emitting diode, conventional lamp, or any suitable device. In the exemplary embodiment, sensor 500 may be comprised of a wide lens 620 connected by fiber optic cable 625 to light detector 630. Sensor 500 may have a single unitary light sensing area 635. In the exemplary embodiment, the sensor 500 may produce a signal having amplitude that corresponds to a protrusion of the substrate into the light beam, or that otherwise corresponds to a length, area, shape, profile, or profile curve of the substrate. In the exemplary embodiment, because the substrate may protrude into the light beam 540 along length D and block a portion of light from reaching the sensor 500, the amplitude of the analog signal may be inversely proportional to D/W, where W is the width of the beam 540 and D is the distance that the substrate protrudes into the beam. In alternate embodiments, the signal may be representative of any suitable interaction area or line between a substrate and a sensor beam. For example, the signal amplitude may represent a two dimensional portion of the distributed beam. The distributed beam may, for example, have a substantially rectangular cross-section of sufficient dimensions such that one side of the beam cross section may extend across a complete chord of the circle at one point in time. An entire region of the substrate, defined by said chord and by the peripheral edge of the substrate, may then intersect the distributed beam and may be embodied in the signal.

Figure 6:
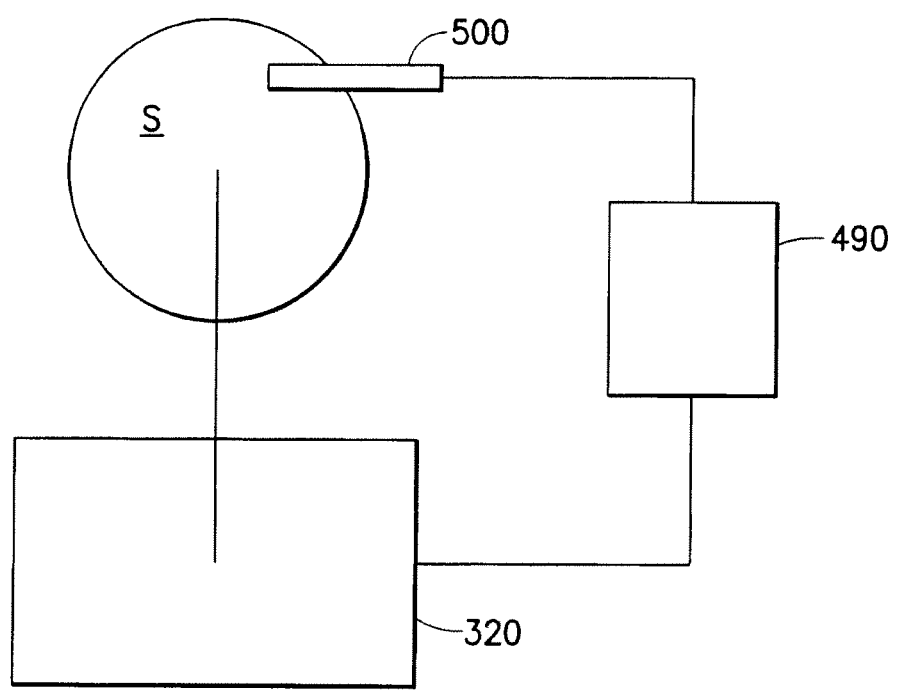
FIG. 6 is a schematic diagram showing the sensor, controller, and transport device of the substrate processing apparatus of FIG. 1.

FIG. 6 is a diagram showing the interrelationship among the substrate S, transport apparatus 320, sensor 500, and control system 490, in accordance with the exemplary embodiment. As may be seen from FIG. 6, the control system may be communicably connected to both the sensor 500 and the transport apparatus 320. The transport apparatus 320 may be operable to transport the substrate S past the sensor 500, as directed by the control system. The sensor 500 may communicate substrate position information to the control system 490, and the control system may then determine substrate position using the communicated information. In alternate embodiments, the control system operate in any suitable way. In alternate embodiments, the relative movement between the substrate and sensor may be affected in any suitable manner for sensing the substrate with the sensor. In other alternate embodiments, the substrate may be stationary with respect to the sensor as the sensor senses the substrate.

Figure 9:
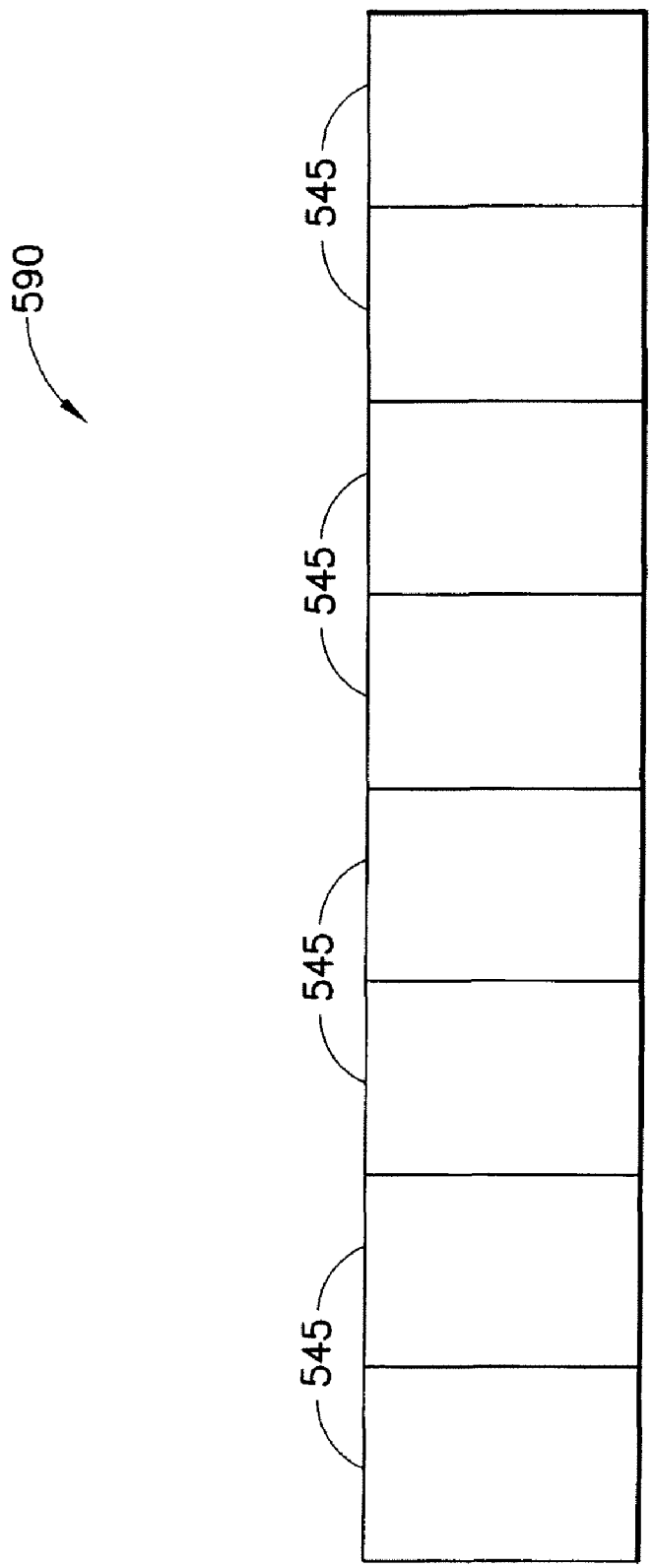
FIG. 9 is a schematic diagram of another sensor which may be used in the substrate processing apparatus in accordance with another exemplary embodiment.

FIG. 9 schematically illustrates a sensor 590 for sensing the substrate in accordance with another exemplary embodiment. FIG. 9 illustrates a light detecting portion of the sensor, and except as otherwise noted the sensor is substantially similar to sensor 500 described before and shown in FIG. 5. As shown in FIG. 9, in the exemplary embodiment an area of the sensor 590 is divided into multiple light-sensing areas or pixels 545. Thus, sensor 590 could be a distributed CCD or CMOV sensor or similar device. Other embodiments of the present invention may use a sensor 590 in place of each sensor 500 where described above. As the light-sensing areas 545 of sensor 590 may be pixilated or substantially discrete, sensor 590 may produce a digital signal to indicate an image of light beam 540 as projected onto the sensor 590. In an exemplary embodiment, length D may thus be determined directly from this digital signal. For example, the control system 490 may continuously monitor the intensity of light at each pixel 545 and regularly report these intensities to the control system as the substrate passes the sensor. The regular reports may be sent periodically each fraction of a second, with possibly hundreds of regular reports being made to the control system as the substrate passes the sensor. In alternate embodiments, the sensor 590 may sense a curvature, profile or shape of the substrate, or may sense any other suitable aspect of the substrate or substrate trajectory that may be used to determine substrate position.

Still other alternate embodiments may use different sensor configurations. As may be realized, in the exemplary embodiments signals or data from the sensor may electronically embody, within the signal and/or data, various dimensional aspects of a sensed portion of the substrate, and these various dimensional aspects may be used to determine substrate alignment relative to a predetermined position. For example, a signal from the sensor may embody an area of a sensed portion of the substrate such as an area between a chord of the substrate and a section of the substrate edge. The signal may also embody a distance, such as a distance into a beam of the sensor that the substrate protrudes. Similarly, the signal may embody a shape, such as a shape sensed by the sensor as the substrate passes it. The signal may embody an edge profile or edge profile curve. For example, in one embodiment a linear portion of the substrate edge may be sensed by a sensor or other suitable device as the substrate passes the sensor, as previously described. In alternate embodiments, the sensor may have a beam with a point cross-section (i.e. non-distributed cross-section beam), wherein a laser beam may be moved along a linear pathway or aimed by pivoting the laser in response to feedback provided by one or more sensors, or the laser beam may be aimed with mirrors or other devices, so that the laser beam remains aimed at the edge of the substrate with the beam tracing out a curve along the edge of the substrate. One approach to such an arrangement is to use a single sensor for detecting diffraction of light from the edge of the substrate. In this arrangement, when the laser beam strikes only the top surface of the substrate the light is reflected off the surface and is not detected by the sensor. Also, when the beam does not strike the substrate at all, the light merely continues on a straight path that does not hit the sensor, and is therefore not detected by the sensor. On the other hand, if the beam strikes the edge of the substrate, diffraction of the light may occur at the edge of the substrate, and a portion of this diffracted light may be detected by the sensor. Thus, a single sensor may be able to detect when the laser beam is aimed at the edge and provide feedback, via a control system, to motors operable to position of the laser (or a mirror, prism, or other device directing a light beam from a laser or other beam source) and aim the beam at the edge of the substrate. The position of the laser, mirror, or other beam-directing device may be monitored by the control system. A signal embodying this position of the laser beam may therefore embody an edge profile curve on the edge of the substrate. In still other alternate embodiments, any number of sensors may be used in any suitable sensor arrangement. Light reflection off substrate surfaces may be sensed for providing feedback as an alternative to sensing diffracted light.

Figure 10:
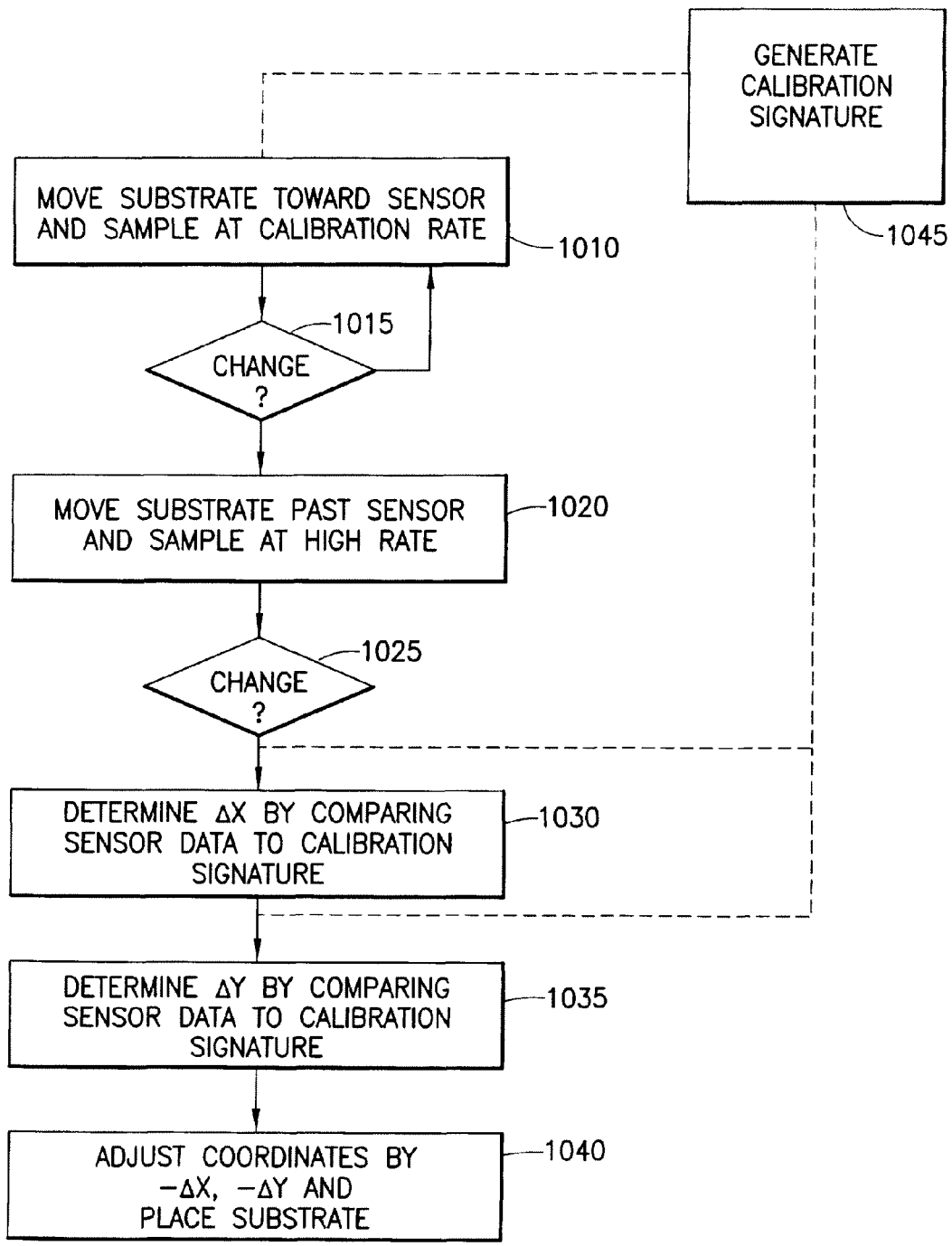
FIG. 10 is a flow chart illustrating an exemplary procedure that may be performed using the substrate processing apparatus of FIG. 1.

Referring now to FIGS. 3 and 10 (that shows a flow chart for effecting alignment), a procedure for substrate alignment is now described in accordance with the exemplary embodiment. In block 1010, the substrate S is moved toward the sensor 500, in the direction of arrow B. In this example, the direction of movement B may coincide with a radial transport direction of the substrate transport apparatus 320. The sensor 500 may produce an analog signal that corresponds to the extent to which the substrate blocks light between the light source and the sensor, the signal thus corresponding the degree to which the substrate intersects the ribbon-shaped beam. In block 1010, the analog signal may be digitally sampled, for example resulting in a digital representation of the amplitude of the analog signal. The digital sampling in block 1010 may occur at a stand-by rate. Each time the signal amplitude is sampled, it may be compared to the previously sampled amplitude in block 1015. In block 1015, the control system 490 may determine, based on comparison of last sampled amplitude to the next-to-last sampled amplitude, whether the sensor 500 has begun to detect the substrate. If, in block 1015, it is determined that the sensor has not yet detected the substrate, block 1010 may be continuously executed, moving the substrate S closer to the sensor 500. Once the control system determines in block 1015 that the sensor has begun to detect the substrate, the sampling rate may be increased to a higher rate in block 1020, while the transport apparatus continues to move the substrate past the sensor. In block 1020, the digitally sampled data representing the analog signal amplitude from the sensor is recorded. Data representing the signal amplitude may be recorded with corresponding positional information for the substrate transport apparatus 320, which may be generated by the positional encoders. Thus, the control system 490 may compile data, wherein the signal data represents end effector position along direction B and the instantaneous signal amplitude A. As noted above, in the exemplary embodiment signal amplitude A may correspond to a profile shape of the substrate (in the exemplary embodiment defined by the instantaneous distance D as sensed by the sensor 500). The sampled data is also repeatedly analyzed by the control system 490 to determine, in block 1025, whether the substrate has gone fully past the sensor 500, in which case the sensor will have stopped detecting the substrate. This determination may be made through comparison of the last sampled amplitude to a known amplitude that results when the light beam is uninterrupted. If the sensor continues detect the substrate, block 1020 may be continuously executed. In the exemplary embodiment, once the sensor stops detecting the substrate, the $\Delta X$ and $\Delta Y$ values may be calculated in steps 1030 and 1035, respectively. In alternate embodiments, the $\Delta X$ and $\Delta Y$ may be calculated without fully passing the substrate past the sensor, as will be described below. As will be explained in greater detail below, the $\Delta X$ and $\Delta Y$ values define an offset of the substrate position from a desired position, along two directions.

Figure 7:
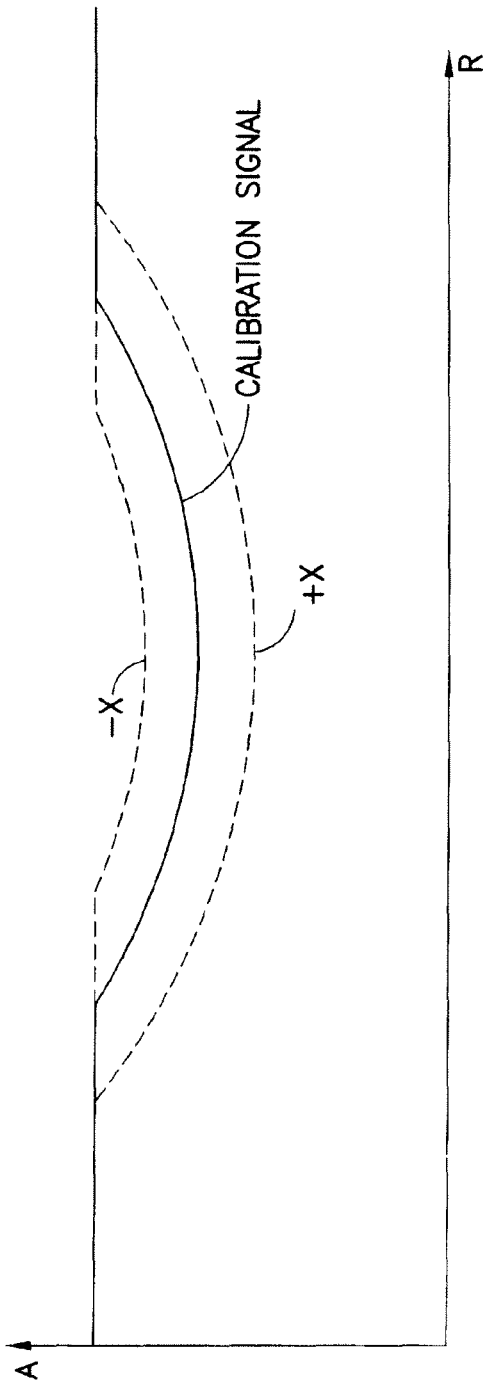
FIG. 7 is a graph illustrating different lines generated by sensor data for different substrate positions.
Figure 8:
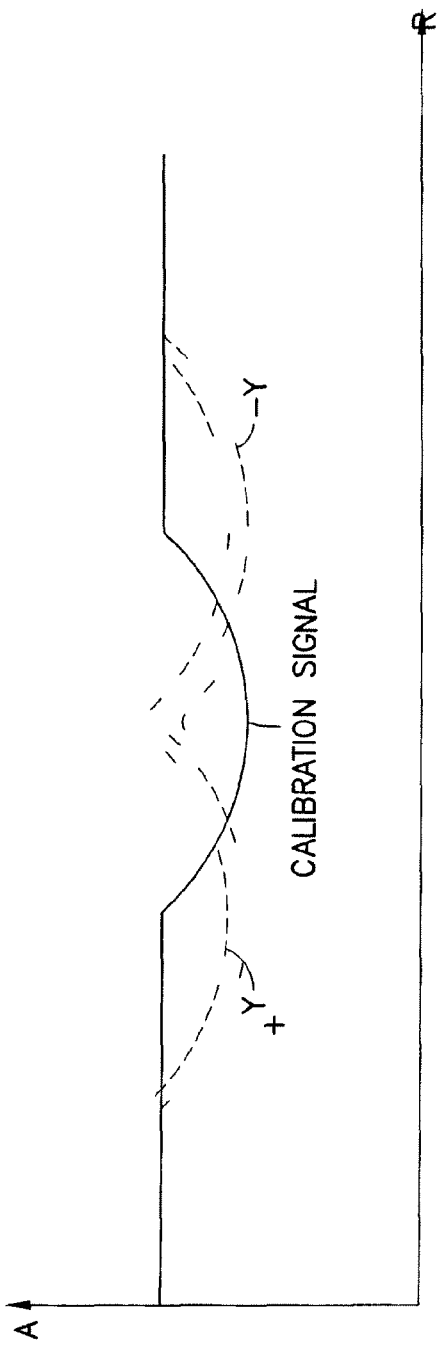
FIG. 8 is a graph illustrating other lines generated by sensor data for different sensor positions.

FIGS. 7 and 8, described in additional detail below, show lines generated by sensor data for different substrate positions. In this example, each of the lines illustrates how a signal amplitude A varies with a substrate transport position R as the substrate passes the sensor. The FIGS. 7 and 8 each show a solid calibration line that may, for example, represent sensor data generated in a calibration procedure. In FIG. 7, the line indicated with the label "+X" represents sensor data that may result when the substrate is displaced in only the positive X direction, tangential to the direction of movement R, relative to a calibration position. The line indicated with the label "−X" represents sensor data that may result when the substrate is displaced in only the negative X direction. FIG. 8 illustrates sensor data resulting from displacements in the Y direction. In FIG. 8, the line indicated with the label "+Y" shows sensor data corresponding to a displacement in only the positive Y direction, relative to a calibration position. The indicated with the label "−Y" shows sensor data corresponding to a displacement in only the −Y direction. FIGS. 7 and 8 show examples of how signal data may vary with displacement of the substrate, according to the exemplary embodiment. In alternate embodiments, any other suitable aspects of signals or data may be used to represent sensed aspects of the substrate or substrate position, for determination of substrate position.

The value for the offset of the substrate along the X-direction (see FIG. 3), ΔX, is calculated in block 1030. The calculation is based on comparing the determined area of a section of the substrate to a calibration or base area. In this case M, the determined area, is the area of the substrate between chord C and edge section E. This is the area that the ribbon-shaped light beam sweeps across in block 1010. To calculate the determined area M, the distance D, which varies with end effector position in direction B, is integrated over that portion of the path of the end effector 365 during which the sensor 500 detects the substrate S. In this example, the transport apparatus 320 may operate using a polar coordinate system <R,θ>, and end effector position may be reported to the control system 490 from the positional encoders in <R,θ> format. In this example, direction B may be coincident with a direction R for a fixed θ position, the end effector 365 may not move in the θ direction as the substrate moves in direction B and, hence, passes the sensor. The curve may be integrated over the radial position R of the end effector. For an alternate embodiment in which direction of movement B is not coincident with a substantially only radial direction of the transport apparatus, a suitable coordinate transformation may be used to find end effector positions along the direction of movement B, as the substrate passes the sensor. Integration may then be carried out over axis B instead of axis R.

In the exemplary embodiment, sensed aspects of the substrate, such as distance D, may be represented by continuous functions of R. In the exemplary embodiment, the amplitude of the signal may be expressed as A, with $A=A_0-D$, wherein $A_0$ is the amplitude of the signal when the substrate is not interfering with the light beam. Thus, A may also be a continuous function of R in the exemplary embodiment. The determined substrate section area M may therefore expressed in the following integral:

$$A_0(R_N - R_0) - \int_{R_0}^{R_N} A(R) dR$$

In this expression, $R_0$ is the end effector position at which the substrate is first detected by the sensor, $R_N$ is the position of the end effector at which the sensor stops detecting the substrate, and dR is an infinitesimal length along the path of the end effector as the substrate passes the sensor. In other embodiments of the present invention, suitable analog circuitry may be used to continuously integrate analog signal amplitude A. For example, this might be accomplished using an analog integrator circuit that employs an operational amplifier. However, in the exemplary embodiment, numerical integration for example, may be carried out using the series of discrete <A,R> data recorded by the control system 490. Thus, area M is expressed as the following summation:

$$\sum_n \frac{1}{2}[|A_n - A_0| + |A_{n+1} - A_0|] \times [R_{n+1} - R_n]$$

Of course, alternative numerical integration techniques may also be used. Here, the subscript n indicates a particular data element in the recorded data. Generally, a greater number of data points tends to result in a more accurate value for M, and thus more accurate alignment. Thus, in block 1010 of FIG. 10, when the sensor has not yet detected the substrate, a relatively low stand-by sampling rate may be used, which may conserve control system processing power in the case where no circuitry is dedicated to the data analysis of block 1015. Then, a higher sampling rate may be used in block 1020, when the substrate is passing the sensor, to increase the accuracy of the area measurement, and thus the accuracy of substrate alignment.

In block 1045 of FIG. 10 an electronic calibration signature may be generated. The calibration signature may be generated in various ways, and may be generated before, during, or after sensing of the substrate. The calibration signature may represent expected sensor output signals or data. For example, the calibration signature may embody an expected area that is sensed (or would be sensed) by the sensor 500 during an alignment procedure when the substrate is in a desired position. In one technique of generating the calibration signature, the control system 490 may maintain a model representing the geometry of the processing apparatus and incorporating known locations of the sensor 500 and transport apparatus 320, and further incorporating known substrate geometry. The model may include a preferred position of the substrate S on the end effector 365, which may be defined as a centered position. Then, the control system 490 may find the expected area, using the model to simulate passage of the substrate past the sensor, and thus finding an expected area value for M that is a theoretical value. Alternatively, a calibration signature representing the expected value may be generated by centering a wafer on the end effector manually and executing blocks 1010 through 1030. The centering may be done using a transparent calibration wafer having inscribed cross-hairs. The determined area M obtained in this calibration procedure may then be used as an expected area for substrate alignment. Any other suitable method may be used to determine the expected area. Other calibration values, calibration data sets, curves, or signatures embodying any other aspects of a sensed portion of a substrate may be generated through similar techniques. That is, a substrate may be passed by the sensor along a desired pathway to generate an expected signal. The substrate may be a dummy substrate or calibration wafer. The expected signals, values, data sets, or profile curve could also be generated using computer modeling, or could be manually input to the control system. Any other suitable technique may be used.

FIG. 7 shows schematically how an offset in the X direction may affect the analog signal produced by the sensor 500. The solid line indicates an expected signal for a substrate with no offset. The amplitude of the signal dips to form a trough as the substrate passes the sensor 500, due to partial blockage of the light beam 540 by the substrate S. The upper dotted line labeled −x indicates the signal resulting when the substrate S is offset in the −x direction. The lower dotted line labeled +x indicates the signal resulting when the substrate S is offset in the +X direction. Note that the trough in the −x signal is shallower than the through in the +x signal, and covers a smaller region along R.

Returning now to FIG. 10, in block 1030 determined area M may be compared to an expected area, to find ΔX. A precise formula may be derived, based upon known sensor positioning and known substrate geometry, to express how the difference between the determined and expected areas varies with ΔX. The relationship may be linear for some substrate geometries, such as with rectangular substrates, but may be nonlinear for discoid substrates or other shapes. In this example embodiment, a first-order approximation is used for a substantially discoid substrate, the expression for ΔX thus taking the following form.

$$\Delta X \approx K \times [\text{Area(expected)} - \text{Area(measured)}]$$

In the above equation, K is a constant. The value K may be found empirically by performing the above described calibration procedure at various ΔX positions, or K may be estimated from known substrate and sensor geometry. The first-order approximation may be suitable if the maximum offset of any substrate is expected to be sufficiently small. The control system 490 may calculate ΔX in block 1030 using the formula above.

In block 1035, the control system 490 may determine ΔY, the offset of the substrate S along the Y-direction. Of course, the order of steps may be altered within certain parameters, and it is not necessary that block 1035 follow block 1030. In general, block 1035 consists of calculating a characteristic quantity of measured area M that corresponds to substrate offset in direction Y. In this specific example, the following expression is used.

$$R(\text{measured}) = \frac{\sum_n [R_n \times A_n]}{\sum_n A_n}$$

As may be seen, the above equation expresses R(measured) as the Y-direction coordinate of the centroid of the measured area M. R(measured) therefore directly represents the Y-position of the substrate, and is calculated from the series of <R,A> data points collected by the control system as the substrate passes the sensor. To find ΔY, R(measured) is simply subtracted from a known Y-coordinate of a centered substrate, R(centered). R(centered) may have been previously ascertained, for example through a calibration procedure in block 1045.

FIG. 8 shows schematically how an offset in the Y direction may affect the analog signal produced by the sensor 500. The solid line indicates an expected signal for a substrate with no offset. The amplitude of the signal dips to form a trough as the substrate passes the sensor 500, due to partial blockage of the light beam 540 by the substrate S. The right side dotted line labeled −y indicates the signal resulting when the substrate S is offset in the −Y direction. The left side dotted line labeled +y indicates the signal resulting when the substrate S is offset in the +Y direction. Note that the trough in the +y signal is shifted in the −R direction from the zero offset case, while the trough in the −y is shifted in the +R direction.

In block 1040 of FIG. 10, the control system 490 may internally adjust the coordinates at which the transport apparatus 320 will be instructed to place the substrate. This is done to enable the transport apparatus to align the substrate with a target location. For example, the target location may be specified as a point $<X_{target}, Y_{target}>$ with which the center of the substrate is to align. For example, a target location 520 is shown in FIG. 3. In block 1040, the control system may instruct the transport apparatus to place the substrate at adjusted coordinates of the target location $<X_{target}-\Delta X, Y_{target}-\Delta Y>$. In this way, the offset of the substrate S on the end effector 365 is taken into account and adjusted for. If the transport apparatus receives positioning commands in <R,θ> format, a known coordinate transformation may be used by the control system to convert the adjusted target location coordinates from <X,Y> to <R,θ> format. The control system may instruct placement of the substrate S at the target location, and the transport apparatus 365 may then execute the instruction.

Figure 12:
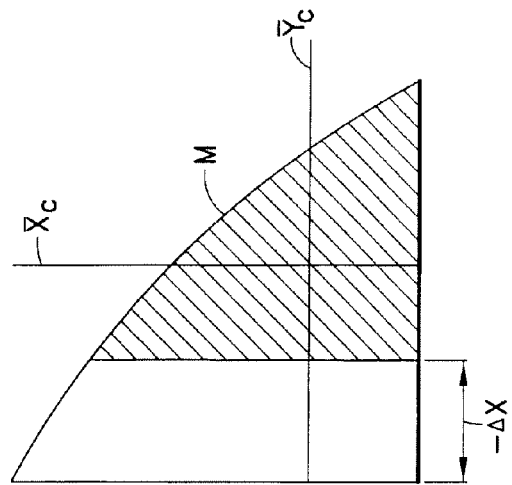
FIG. 12 is a schematic illustration of a portion of a substrate, showing a sensed shape M, according to the embodiment of FIG. 11.
Figure 13:
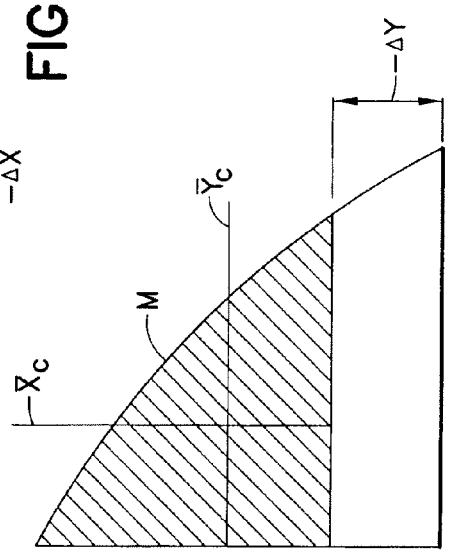
FIG. 13 is another schematic illustration of a portion of a substrate, showing another sensed shape M, according to the embodiment of FIG. 11.
Figure 11:
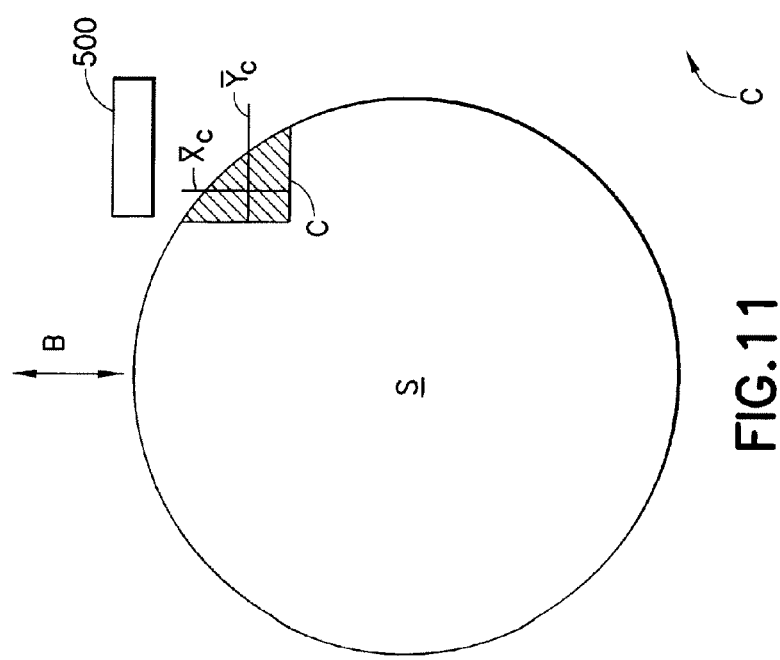
FIG. 11 is a schematic illustration of a substrate, showing a calibration shape in accordance with still another exemplary embodiment.

FIGS. 11-13 illustrate geometrically the determination of the values ΔX and ΔY, the coordinates of the substrate offset, in another embodiment. In general, this embodiment may have a substrate processing apparatus as shown in FIG. 1 and described above. FIG. 11 shows a substrate S with a calibration shape C shown superimposed thereon. Calibration shape C, shown as a shaded area, represents a portion of the substrate that may be sensed with the sensor in a calibration procedure, or otherwise determined via computer modeling or other techniques. Calibration shape C may represent, for example, a shape on the substrate over which the light beam of the sensor moves during an alignment procedure, when the substrate is located in a desired position. FIG. 11 schematically shows sensor 500 in a one location relative to the substrate, though in alternate embodiments the sensor may have any suitable location. As may be seen from FIG. 11, in this exemplary embodiment the substrate S may or may not pass completely through the sensor during an alignment procedure, as extension of a small portion of the substrate through the sensor in direction B may be sufficient for the sensor to sense the calibration area. As the substrate position may be determined before the substrate completely passes the sensor, movement of the substrate transport apparatus may be quickly adjusted in response to the determined substrate position. FIGS. 12 and 13 each show a sensed shape M that may be compared with the calibration shape to determine the substrate position coordinates ΔX and ΔY. Shape M may be sensed in a manner similar to the sensing of the calibration shape C. Shape M may defined, along one straight side that is substantially parallel to the B axis, by an edge of the light beam 540 of sensor 500. Along the other straight side that is perpendicular to the B axis, shape M may be defined by a radial position of the transport apparatus. For example, the control system may begin collecting data representing the sensed shape from the sensor at a predetermined radial extension position of the substrate transport apparatus, and may cease collecting such data at another predetermined radial extension position of the transport apparatus. At the beginning position, the substrate may be positioned outside of the light beam, while at the ending position the light beam may intersect the substrate. Between these two positions, the sensor may sense a portion of the substrate defining the sensed shape M. In alternate embodiments, any other suitable arrangement may be employed for sensing a shape on the substrate, and the sensed shape may be defined in any suitable manner. In this exemplary embodiment, the sensed shape is two-dimensional. Alternate embodiments may sense aspects of the substrate that have any other suitable number of dimensions. For example, in alternate embodiments the shape of a one-dimensional curve along a section of the periphery of the substrate may be sensed. This sensed curve may be used to determine substrate offset in two directions by comparing the sensed curve to a calibration curve, or by calculating the location of the sensed curve on the substrate using a computer model.

FIG. 11 shows a calibration shape C that may correspond to a sensed shape resulting when the substrate is in a desired position. The calibration shape C may has various aspects that can be represented quantitatively and used as a basis for comparison with other shapes. For example, the calibration shape has a definite area. In addition, the calibration shape has a centroid, the location of which may be expressed with the coordinates $X_C$ and $Y_C$ as shown in FIG. 11. In this exemplary embodiment, the sensed shape M may be compared to the calibration shape C on the basis of the respective areas and the respective centroid coordinates in one direction (for example, $X_C$). In alternate embodiments, centroid coordinates in more than one direction may be used for comparison of the shapes C and M (e.g. using both $X_C$ and $Y_C$), or any other suitable basis of comparison of the shapes may be employed.

FIG. 12 illustrates an example of a sensed shape M that may result when the substrate is offset in (only) the −X direction from the desired position. The distance marked "−ΔX" represents the distance that the substrate is offset in the −X direction. As may be seen from FIG. 12, in this example an offset in the −X direction results in a sensed shape M (shown shaded) having a smaller area than the area of the calibration shape C. In FIG. 12, the values $X_C$ and $Y_C$ represent the coordinates of the centroid of the sensed shape M. FIG. 13 illustrates an example of a sensed shape M that may result when the substrate is offset in (only) the −Y direction from the desired position. In FIG. 13, the values $X_C$ and $Y_C$ again represent the coordinates of the centroid of the sensed shape M. As illustrated by FIGS. 12 and 13, different substrate positions may result in different sensed shapes M, but it is possible for the area of the sensed shape M to be the same even though the substrate positions are different. Therefore a comparison of area values alone may not be sufficient to determine substrate position. In this example, the value $X_C$ is used along with the area of the sensed shape M to determine the position of the substrate along both the X and Y axes. FIGS. 12 and 13 illustrate two sensed shapes M corresponding to different substrate positions. Although the sensed shapes M are shown with identical areas, the values for $X_C$ are different. In this exemplary embodiment, the aspects of the sensed shape that are used to determine substrate position are the area of M and the centroid coordinate $X_C$ (or, alternatively, $Y_C$). For example, the control system may lookup the substrate offset <ΔX,ΔY> in a memory. Information relating area of M, centroid coordinate $X_C$, and substrate offset <ΔX,ΔY> may be precalculated and stored in the memory in matrix form, for example with substrate positions resulting in the same area for M grouped in rows and substrate positions resulting in the same value for $X_C$ grouped in columns. Having determined the area of M and the value of $X_C$, the control system may lookup the contents of the corresponding matrix element to find substrate the offset <ΔX,ΔY>. In alternate embodiments, the control system may use a mathematical formula relating the area of M, centroid coordinate $X_C$, and substrate offset <ΔX,ΔY> to calculate the substrate position. The mathematical formula may be specific to the shape of the substrate (e.g. circular, rectangular). In alternate embodiments, any other suitable technique may be used to determine substrate position from aspects of a sensed shape, curve, or profile. Alternate embodiments may sense the entire substrate, or only a portion of the substrate, and may or may not pass the substrate completely through the sensor when sensing the substrate with the sensor.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A substrate processing apparatus comprising:
   a transport apparatus adapted for transporting a substrate between processing stations of the apparatus;
   at least one sensor connected to the transport apparatus and capable of sensing the substrate during transport by the transport apparatus, the at least one sensor being arranged for sending at least one signal in response to sensing the substrate; and
   a controller communicably connected to the sensor and arranged to determine alignment of the substrate in at least two directions during transport of the substrate by the transport apparatus, the at least two directions being angled relative to each other, relative to a predetermined location, the controller being configured to determine alignment of the substrate from the at least one signal sent by only one of the at least one sensor when sensing the substrate no more than once.

2. The apparatus according to claim 1, wherein the at least one signal sent by only one of the at least one sensor comprises data embodying a shape of the substrate.

3. The apparatus according to claim 1, wherein the only one of the at least one sensor comprises a beam source and a beam detector.

4. The apparatus according to claim 3, wherein the sensor is a through-beam sensor.

5. The apparatus according to claim 3 wherein the sensor is a reflectance sensor.

6. The apparatus according to claim 3 wherein the beam source generates a beam having a substantially linear cross-section.

7. The apparatus according to claim 3, wherein the at least one signal sent by only one of the at least one sensor embodies a distance the substrate protrudes across a beam produced by the beam source.

8. The apparatus according to claim 3, wherein the at least one signal sent by only one of the at least one sensor embodies an area of the substrate passing through a beam produced by the beam source.

9. The apparatus according to claim 8, wherein the controller has programming to determine a positional offset of the substrate that comprises a program for comparing a predetermined area with the area, embodied in the at least one signal sent by only one of the at least one sensor, of the substrate passing through the beam produced by the beam source.

10. The apparatus according to claim 3, wherein sensing the substrate no more than once comprises sensing an edge of the substrate.

11. The apparatus according to claim 1 wherein the controller is further arranged to position the substrate at the predetermined location, using the transport apparatus and adjusting for the determined alignment of the substrate in the at least two directions.

12. A system for determining the position of a substrate, the system comprising:
   a control system;
   a substrate transport apparatus connected to the control system and capable of transporting the substrate; and
   a sensor, connected to the control system, and having a sensor beam with a substantially linear beam cross-section, the sensor being adapted for sensing the substrate when the substrate intersects the sensor beam;
   wherein the control system is adapted to generate relative movement between the substrate and the sensor so that the substrate breaks the sensor beam, and wherein the sensor is adapted for sending the control system an electronic signal embodying an area measurement of a segment of the substrate within the sensor beam.

13. The system according to claim 12, wherein the control system is further adapted to determine the position of the substrate in at least a first direction, relative to a predetermined position, by applying a known relationship between the area measurement and the predetermined position.

14. The system according to claim 13, wherein the control system is further adapted to determine the position of the substrate in a second direction, relative to the predetermined position, by applying another known relationship between the predetermined position and the area measurement.

15. The system according to claim 12, wherein the sensor signal corresponds to a length, along the linear beam cross section, that the substrate intersects when the substrate passes through the sensor beam.

16. The system according to claim 12, wherein the area measurement represents a profile of the segment of the substrate passing through the sensor beam.

17. The system according to claim 16, wherein the control system comprises programming for integrating a profile curve of the substrate over a path of the substrate, the profile curve being defined by the electronic signal.

18. The system according to claim 12, wherein the sensor is a through-beam sensor.

19. The system according to claim 12, wherein the sensor is a reflectance sensor.

20. The system according to claim 12, wherein sensor comprises a plurality of discrete light sensing areas.

21. The system according to claim 12, wherein the sensor has only one unitary light-sensing area.

22. A substrate processing apparatus, the apparatus comprising:
- a frame;
- a substrate station connected to the frame;
- a control system;
- a substrate transport apparatus, the transport apparatus connected to the frame and communicably coupled to the control system; and
- a beam sensor connected to the frame for collecting edge profile data of the substrate, the sensor being communicably coupled to the control system;
- wherein the control system is adapted to effect relative movement between the substrate on the transport apparatus and the sensor, and the sensor is adapted to generate an electronic signal during substrate transport with data that embodies an edge profile of the substrate; and
- wherein the control system is further adapted to determine during substrate transport, using the edge profile, an offset of the substrate, in at least two directions, from a predetermined location, and to adjust movement of the transport apparatus to compensate for the offset and to position the substrate at the predetermined location at the substrate station.

23. The apparatus according to claim 22, wherein the data corresponds to a degree of disruption of the beam by the substrate as the substrate passes the sensor.

24. The apparatus according to claim 23, wherein the sensor has a sensing beam with a narrow, elongate cross-section.

25. The apparatus according to claim 24, wherein the sensor has a single unitary light detecting area, and wherein the sensor generates an analog signal corresponding to the intensity of light detected by the single unitary light detecting area.

26. The apparatus according to claim 23 wherein the substrate station is a load lock.

27. The apparatus according to claim 23 wherein the substrate station is a processing module.

28. The apparatus according to claim 23 wherein the beam sensor is a through-beam sensor.

29. The apparatus according to claim 23 wherein the beam sensor is a reflectance sensor.

30. A method for processing substrates in a substrate processing apparatus comprising:
- generating an electronic calibration signature, the electronic calibration signature comprising expected sensor output information;
- providing the apparatus with a through beam sensor, capable of sensing a substrate moving through the sensor, and a controller communicably connected to the sensor;
- sensing the substrate with the sensor, and in response to sensing the substrate, the sensor sending a signal to the controller embodying an electronic signature of the substrate, the electronic signature of the substrate corresponding to a sensed shape of the substrate; and
- with the controller, comparing the electronic signature of the substrate with the electronic calibration signature to determine alignment of the substrate relative to a predetermined location.

31. The method according to claim 30, wherein the calibration signature represents a profile of at least part of the substrate.

32. The method according to claim 30, wherein determining the alignment of the substrate relative to the predetermined location comprises determining the alignment in at least two directions, angled relative to each other.

33. The apparatus according to claim 2, wherein the shape of the substrate comprises an edge profile of the substrate.

* * * * *